Oct. 8, 1957     J. E. HOYLE     2,808,682
CONTROL DEVICE FOR MODEL AIRPLANES
Filed Dec. 11, 1956     2 Sheets-Sheet 1

INVENTOR.
JAMES E. HOYLE
BY
McMorrow, Berman + Davidson
ATTORNEYS

Oct. 8, 1957
J. E. HOYLE
2,808,682
CONTROL DEVICE FOR MODEL AIRPLANES
Filed Dec. 11, 1956
2 Sheets-Sheet 2
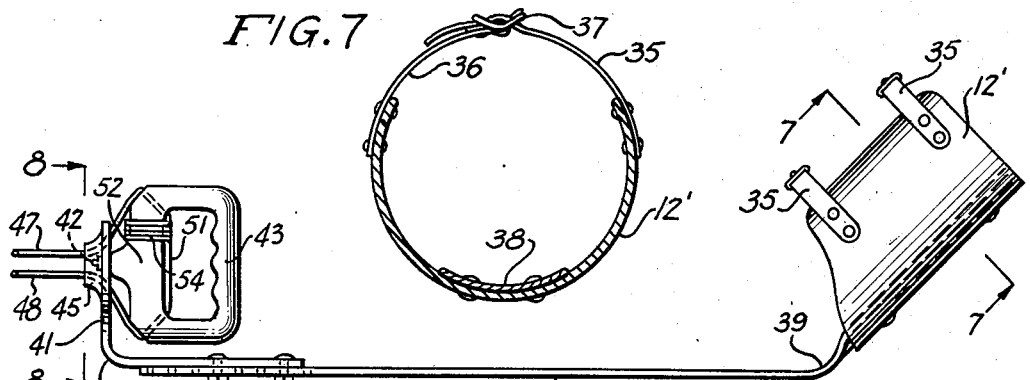
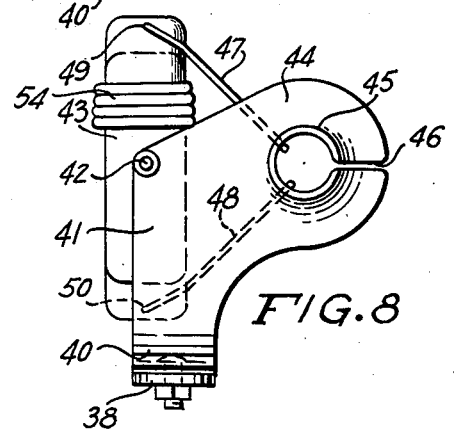
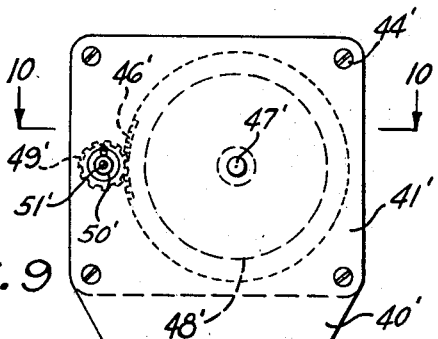
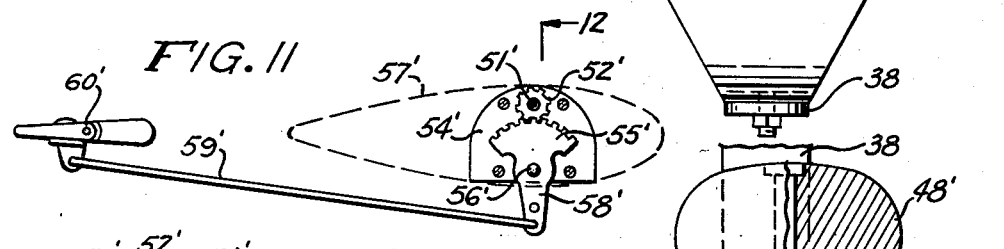
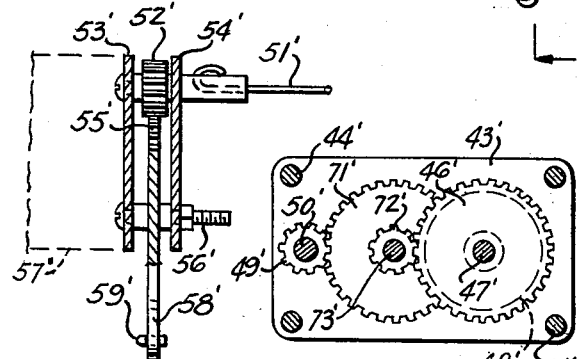
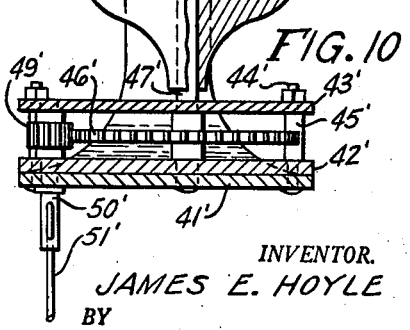
INVENTOR.
JAMES E. HOYLE
BY
McMorrow, Berman & Davidson
ATTORNEYS United States Patent Office 2,808,682
Patented Oct. 8, 1957

2,808,682

CONTROL DEVICE FOR MODEL AIRPLANES

James E. Hoyle, La Mesa, Calif.

Application December 11, 1956, Serial No. 627,637

6 Claims. (Cl. 46—77)

This invention relates to means for controlling model airplanes in flight, and more particularly to a device for controlling a tethered power driven model airplane by wrist action.

A main object of the invention is to provide a novel and improved control device for guiding a tethered power driven model airplane, said device being simple in construction, being easy to operate, and being arranged so that a model airplane controlled thereby may be guided in a desired direction merely by the wrist action of the operator.

A further object of the invention is to provide an improved control device for guiding the flight of a power driven tethered model airplane, the control device being inexpensive to manufacture, being durable in construction, being easy to mount on the arm of the user thereof, being light in weight, and being relatively compact in size.

Further objects and advantages of the invention will become apparent from the following description and claims, and from the accompanying drawings, wherein:

Figure 6 is a side elevational view of a further modified form of model airplane control device according to the present invention.

Figure 7 is an enlarged cross sectional view taken on the line 7—7 of Figure 6.

Figure 8 is an enlarged cross sectional view taken on the line 8—8 of Figure 6.

Figure 9 is a cross sectional view similar to Figure 8 but showing a still further modified form of the model airplane control device of this invention.

Figure 10 is a horizontal cross sectional view taken on the line 10—10 of Figure 9.

Figure 11 is a longitudinal cross sectional view taken through portions of a model aircraft and illustrating the manner in which said portions are controlled by the control cable of the device illustrated in Figures 9 and 10.

Figure 12 is an enlarged vertical cross sectional view taken on the line 12—12 of Figure 11.

Figure 13 is a transverse vertical cross sectional view taken through a portion of a control device representing a further modification of the form of the invention shown in Figures 9 and 10.

Figure 1:
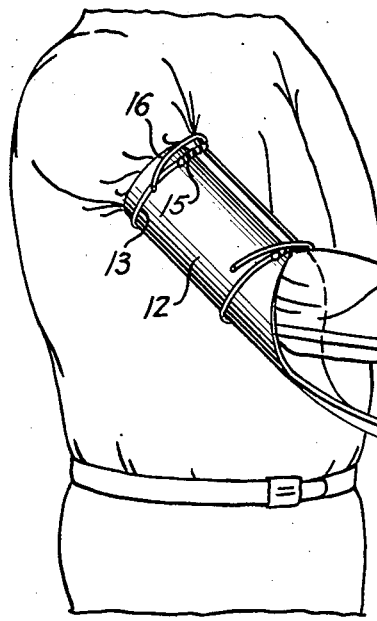
Figure 1 is a side elevational view of an improved model airplane control device according to the present invention, shown mounted in operating position.

Referring to the drawings, and more particularly to Figure 1, 11 generally designates one form of control device for guiding a tethered power driven model airplane, in accordance with the present invention. The device 11 comprises a sleeve-like member 12 of flexible material, such as leather, or the like, having flexibility laterally, but having substantial stiffness in an axial direction, whereby the sleeve-like member 12 may be flexed to allow said member to be engaged on the upper portion of the operator's arm above the elbow, as shown in Figure 1.

The sleeve-like member 12 may comprise a piece of leather of substantial thickness which is suitably formed to the sleeve-like shape, and is dimensioned to fit on the upper arm portion of the operator. Secured around the sleeve-like member 12 are a pair of flexible fastening bands 13, 13 of wire, or the like, formed with loops at their ends, terminating adjacent the opposite longitudinal edges of the member 12. The loops, shown at 14, have connected thereto short sections of chain 15, and the opposing chain sections 15 are detachably secured together by means of arcuately shaped clips 16, as shown in Figure 5.

Figure 5:
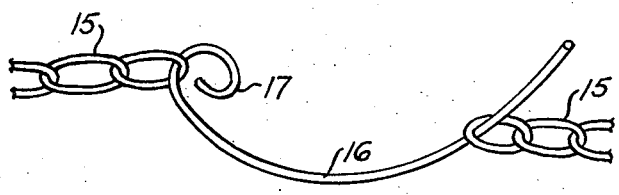
Figure 5 is an enlarged fragmentary view showing one of the clip members employed on the sleeve portion of the control device, as illustrated in Figures 1 to 4, and indicating the manner in which the clip member engages the end links of the fastening chain members employed with the sleeve member.

Each clip 16 is formed at one end with a spirally shaped hook portion 17 engaging the end link of one of the chain sections 15, the opposite end portion of the clip 16 being engaged through the end link of the opposing chain section 15, as illustrated in Figure 5. By rotating the clip 16 in a counterclockwise direction, as viewed in Figure 5, the two end links are brought adjacent to each other and are engaged together in the spiral loop 17 of the clip, the clip being held in this position by the tension in the chain section 15 developed by the compression produced by the sleeve member 12 on the upper arm portion of the operator. To release the sleeve member, it is merely necessary to return the clips 16 to their unfastened positions shown in Figure 5.

Designated at 18 is a rigid support bar which is secured in the lower portion of the sleeve member 12 in any suitable manner, and in a longitudinally extending position, the bar 18 extending forwardly a substantial distance from the sleeve member, as shown in Figure 1, and being formed at its forward end with an upstanding vertical portion 19 of substantial height. Journaled in the upstanding portion 19 is a horizontal shaft 20, and secured to said shaft is a generally D-shaped handle 21 located between the upstanding portion 19 and the sleeve member 12 at a position where it can be grasped by the operator's hand and can be rotated by the operator's wrist action.

The upstanding portion 19 is formed with respective vertically spaced apertures 22 and 23 through which extend respective control cables 24 and 25, said cables being respectively secured in the top and bottom end portions of the handle 21, as shown respectively at 26 and 27 in Figure 1.

Figure 4:
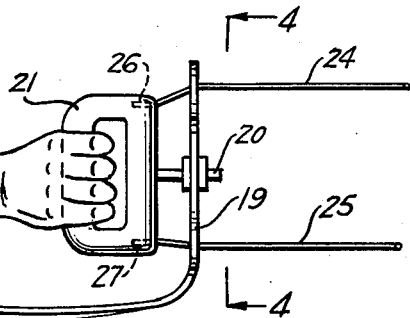
Figure 4 is an enlarged cross sectional detail view taken on the line 4—4 of Figure 1.

As will be understood, the cables 24 and 25 are connected to a control element on the tethered, power driven model airplane and are arranged so that rotation of the handle member 21 provides complementary reciprocating movements of the cable members 24 and 25, that is, when one moves forward the other moves rearward a similar amount, and accordingly provides corresponding movement of the control element of the model aircraft. Thus, by rotating the handle 21 in one direction, the model aircraft can be caused to move in one direction, whereas rotation of the handle 21 in the opposite direction causes the aircraft to move in a similarly opposite direction. Positive and accurate control of the movement of the cables 24 and 25 is provided because the handle 21 is rotatable relative to the upstanding guide portion 19, and consequently, the actions on the cables 24 and 25 are accurately in opposition responsive to the twisting action of the handle 21. The degree of accuracy of the opposing actions of the cables 24 and 25 may be controlled by suitably dimensioning the apertures 22 and 23 and by properly locating said apertures with respect to the shaft 20. As shown in Figure 4, the apertures 22 and 23 are preferably offset a substantial distance laterally from the shaft 20, said shaft being spaced at equal distances from the respective apertures 22 and 23, as illustrated. Thus, the cables 24 and 25 engage against the side edges of the apertures 22 and 23 and are maintained in sliding contact with the side edges of the apertures through a relatively wide arc of rotation of the handle 21.

Figure 2:
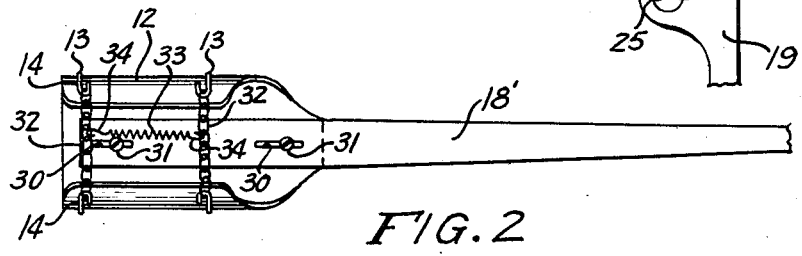
Figure 2 is a top plan view of the rear portion of a modified form of model airplane control device according to the present invention.
Figure 3:
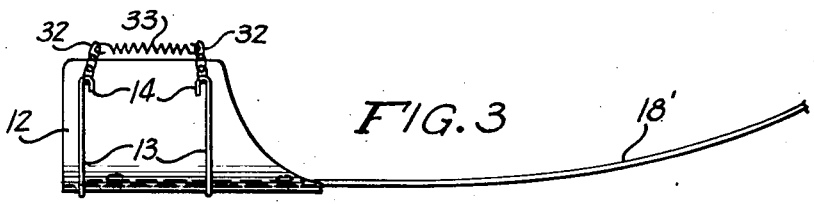
Figure 3 is a side elevational view of the structure shown in Figure 2.

Referring now to the form of the invention shown in Figures 2 and 3, the forwardly extending support member, illustrated at 18' is adjustably secured to the interior bottom surface of the sleeve member 12 by the provision of longitudinally spaced, longitudinally extending slots 30, 30 in the member 18' through which extend clamping screws 31, 31, provided on their outer ends with suitable fastening nuts, or threadedly engaged in the sleeve member 12, so that the member 18' may be rigidly clamped to the sleeve member 12 in a desired position of adjustment, in accordance with the length of the user's arm. The end loops 14 of the fastening bands 13 are connected together by short lengths of chain 32, and tension may be provided in said chain lengths by the provision of a coiled spring 33 having hook elements 34 at its ends engaged with the intermediate links of the chains 32, 32, to exert opposing forces on the intermediate portions of the chains 32 and to thus develop tension therein sufficient to clamp the sleeve member 12 to the upper portion of the user's arm.

Obviously, the sleeve member 12 may be made of any suitable material, and is not limited to leather, since various other materials may be employed, such as plastic material, sheet metal, or the like.

Referring now to the form of the invention shown in Figures 6, 7 and 8, 12' designates a sleeve member adapted to be engaged on the upper portion of the operator's arm, said sleeve member being provided with respective pairs of cooperating fastening strap elements 35, 36 provided with a buckle 37, as shown in Figure 7, whereby the strap members may be interengaged in a conventional manner to secure the sleeve member 12' tightly on the upper portion of the user's arm above the elbow. Rigidly secured to the inside surface of the bottom of the sleeve member 12' longitudinally, and extending forwardly therefrom is a support bar 38, the bar being suitably bent, as shown at 39, to accommodate the operator's elbow. Adjustably secured on the forward end of the bar 38 is the L-shaped bracket 40 having the vertical, upstanding support portion 41, in the upper portion of which is journaled a shaft 42 to which is secured the handle 43, the handle being located rearwardly of the support 41 in a position to be easily grasped by the operator's hand. The top portion of the upstanding member 41 is formed with a laterally extending arm 44, said arm being formed with a forwardly convergent annular conduit member 45 which is split at 46 to allow the cables 47 and 48 to be inserted in the conduit portion 45. As shown, the control cables 47 and 48 embrace the inside surface of the conduit element 45 and engage through respective apertures 49 and 50 formed in the top and bottom portions of the handle 43. Thus, the cables 47 and 48 may comprise a single unitary cable which is looped through the apertures 49 and 50 to define a loop 51 engaging against the inside surface of the front arm 52 of the generally D-shaped handle 43. As shown in Figure 6, the rear loop element 51 may be clamped to the handle arm 52 by wrapping a plurality of turns of string 54 around the arm 52 and the cable element 51.

As in the preceding forms of the invention described, the cable elements 47 and 48 may be moved relative to each other by rotating the handle 43, thus providing accurate control of the associated control members of the tethered model airplane.

Figures 9 and 10 illustrate a further modified form of the invention, wherein a support member 40' is adjustably secured on the arm 38, said support member 40' being provided with the vertical upstanding forward flange 41' to which is secured a bearing plate member 42'. Designated at 43' is a similar bearing plate member which is secured in parallel spaced relation to the bearing plate member 42', as by the use of bolts 44' passing through spacer sleeves 45' positioned between the plates 42' and 43'. Journaled between the plates 42' and 43' is a relatively large gear 46' which is mounted on the shaft 47'. The shaft 47' extends rearwardly over the horizontal arm of the bracket 40' and has secured thereon the handle 48' which may be readily grasped by the operator. Journaled between the plates 42' and 43' is a pinion gear 49' which meshes with the relatively large gear 46' and which is secured on a shaft 50', projecting forwardly through the flange 41'. Non-rotatably secured to the shaft 50' is a hardened steel wire, shown at 51', said wire being connected to a rotatable control element on the tethered model airplane, such as the control pinion gear 52', shown in Figure 11.

As shown in Figures 11 and 12, the pinion gear 52' may be suitably mounted for rotation between a pair of vertical support plates 53' and 54' and may meshingly engage a sector gear 55' pivoted between the plates 53' and 54' at 56'. The plates 53' and 54' are mounted in the wing or fuselage of the model plane, at or near the center of gravity of the plane, for example, in the wing, shown at 57', and the sector gear 55' is provided with a depending arm 58' which is connected by a rod 59' to the adjustable control element 60' of the model airplane, so that the element 60' rotates responsive to the rotation of the sector gear 55', which in turn rotates responsive to rotation of pinion gear 52' caused by torsion in the hardened steel wire 51'. This torsion is developed by rotating the control knob 48', which in turn rotates the pinion gear 49' by an amount depending upon the gear ratio between the large gear 46' and said pinion gear. Rotation of the pinion gear 49' produces similar rotation of the shaft 50' and develops a corresponding amount of torsion in the hardened steel wire 51'.

The multiplication of the rotation of shaft 47' may be considerably increased by the provision of additional gearing between shaft 47' and pinion gear 49', in the manner illustrated in Figure 13, wherein the turn ratio between the driving gear 46' and the pinion gear 49', is increased by the use of an additional pinion gear and large gear in the gear train between the driving gear 46' and the pinion gear 49'. Thus, a large gear 71' is secured on a common shaft with a pinion gear 72', said shaft being shown at 73', the gears being located between the plates 43' and 42' in the same manner as the gears 46' and 49', the large gear 71' meshing with the pinion gear 49' and the small gear 72' meshing with the gear 46'.

While certain specific embodiments of an improved device for controlling a tethered power driven model airplane have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A device for controlling a tethered power driven model airplane by wrist action comprising a sleeve-like member of flexible material having substantial stiffness in an axial direction, means formed and arranged to clampingly secured said sleeve-like member to the upper portion of an operator's arm above the elbow, a forwardly extending, substantially rigid support bar secured to said sleeve-like member, said bar being of sufficient length to extend forwardly beyond the operator's hand, an upstanding support on the forward end of said bar, a shaft element journaled in said support, means for non-rotatably connecting a model airplane control wire to said shaft element, a second shaft element coupled to a handle member and rotatably mounted on said support, and operatively coupled to first shaft element, said handle member being located in a position to be grasped by the operator's hand and to be rotated by the operator's wrist action.

2. A device for controlling a tethered power driven model airplane by wrist action comprising a sleeve-like member of flexible material having substantial stiffness in an axial direction, means formed and arranged to clampingly secure said sleeve-like member to the upper portion of an operator's arm above the elbow, a forwardly extending, substantially rigid support bar secured to the bottom of said sleeve-like member, said bar being of sufficient length to extend forwardly beyond the operator's hand, an upstanding support on the forward end of said bar, said support being formed with a guide aperture, a shaft element journaled through said support, and located laterally from said guide aperture, a handle connected to said shaft element, and being located in a position to be grasped by the operator's hand and to be rotated by the operator's wrist action, and a control element extending through said guide aperture and secured to said handle.

3. A device for controlling a tethered power driven model airplane by wrist action comprising a sleeve-like member of flexible material having substantial stiffness in an axial direction, means formed and arranged to clampingly secure said sleeve-like member to the upper portion of an operator's arm above the elbow, a forwardly extending, substantially rigid support bar secured to the bottom of said sleeve-like member longitudinally thereof, said bar being of sufficient length to extend forwardly beyond the operator's hand, an upstanding support on the forward end of said bar, said support being formed with a plurality of guide apertures, a shaft element journaled through said support, and located laterally from said guide apertures, a handle connected to said shaft element, and being located in a position to be grasped by the operator and to be rotated by wrist action, and respective flexible control cables extending through said guide apertures and secured to said handle.

4. A device for controlling a tethered power driven model airplane by wrist action comprising a sleeve-like member of flexible material having substantial stiffness in an axial direction, means formed and arranged to clampingly secure said sleeve-like member to the upper portion of an operator's arm above the elbow, a forwardly extending, substantially rigid support bar secured to said sleeve-like member, said bar being of sufficient length to extend forwardly beyond the operator's hand, an upstanding support on the forward end of said bar, a shaft element journaled in said support, means for non-rotatably connecting a model airplane control wire to said shaft element, a handle coupled to said shaft element, means for coupling a model airplane control element to said shaft element or handle, said handle member being located in a position to be grasped by the operator's hand and to be rotated by the operator's wrist action.

5. A device for controlling a tethered power driven model airplane by wrist action comprising a sleeve-like member of flexible material having substantial stiffness in an axial direction, means formed and arranged to clampingly secure said sleeve-like member to the upper portion of an operator's arm above the elbow, a forwardly extending, substantially rigid support bar secured to said sleeve-like member, said bar being of sufficient length to extend forwardly beyond the operator's hand, an upstanding support on the forward end of said bar, a shaft element journaled in said support, a handle member coupled to said shaft element and located in a position to be grasped by the operator's hand and to be rotated by the operator's wrist action, and a means for controlling a tethered power driven model airplane operatively coupled to said handle member.

6. A device for controlling a tethered self-propelled model airplane by wrist action comprising a sleeve-like member of flexible material having substantial stiffness in an axial direction, means formed and arranged to clampingly secure said sleeve-like member to the upper portion of an operator's arm above the elbow, a forwardly extending substantially rigid support bar secured to said sleeve-like member said bar being of sufficient length to extend forwardly beyond the operator's hand, an upstanding support on the forward end of said bar, a shaft element journaled in said support, a handle member non-rotatably attached to said shaft member and means operatively coupled to said handle and shaft member to cause a tethered model airplane control wire to rotate in response to the operator's wrist action.

References Cited in the file of this patent
UNITED STATES PATENTS

| | | |
|---|---|---|
| 2,536,875 | Dalrymple | Jan. 2, 1951 |
| 2,573,219 | Pursell | Oct. 30, 1951 |
| 2,743,068 | Walker | Apr. 24, 1956 |
| 2,765,128 | Barth | Oct. 2, 1956 |